Jan. 29, 1963  C. R. WEAVER ETAL  3,075,565
COMBINATION EQUAL-SHARE PIE CUTTING GUIDE AND CARRYING CASE
Filed Aug. 29, 1960  3 Sheets-Sheet 1

INVENTORS.
CLAIR R. WEAVER
MARY A. WEAVER

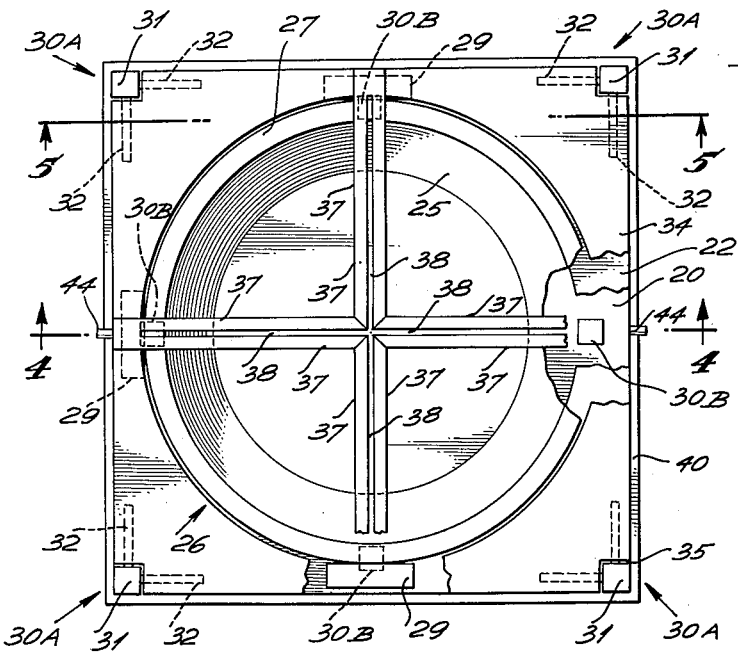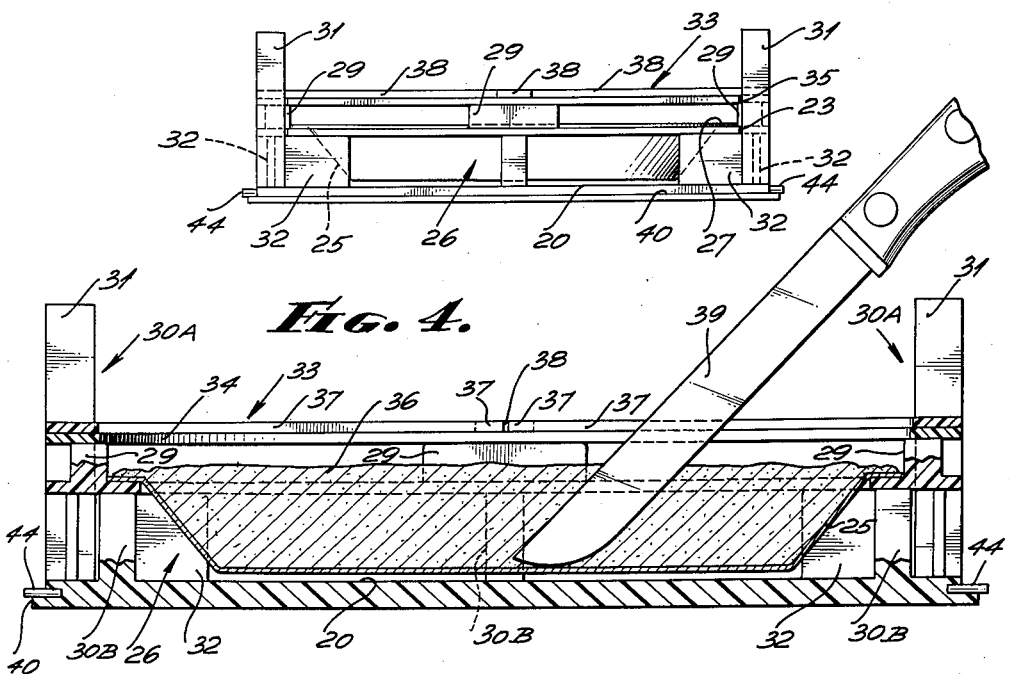

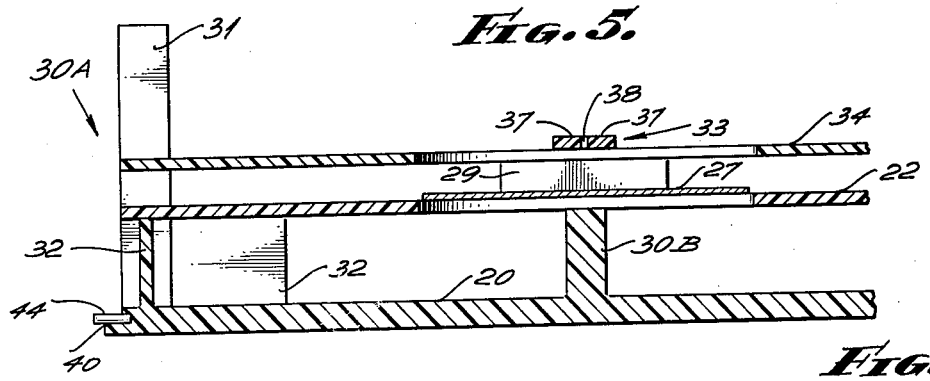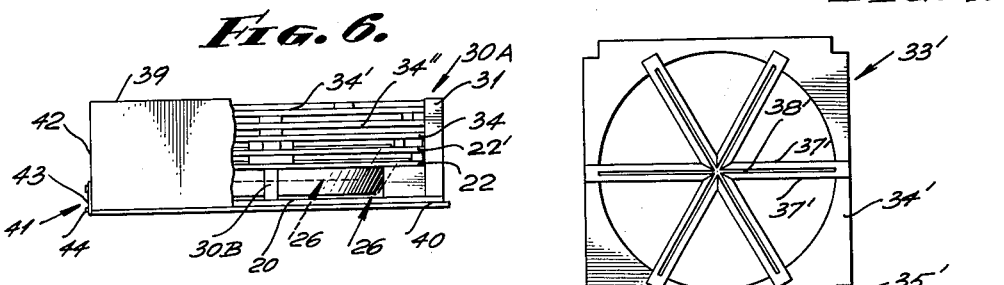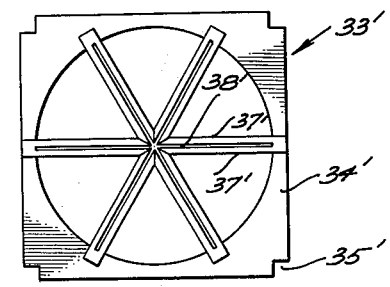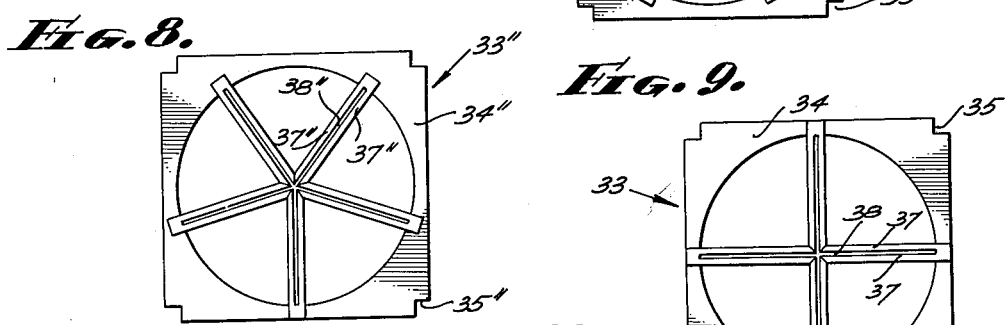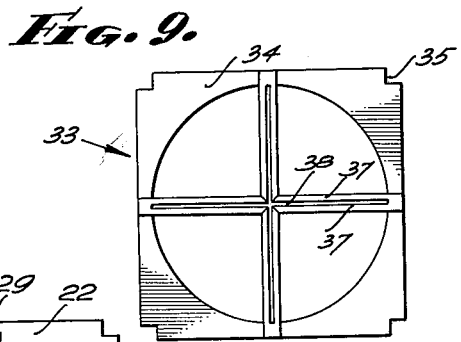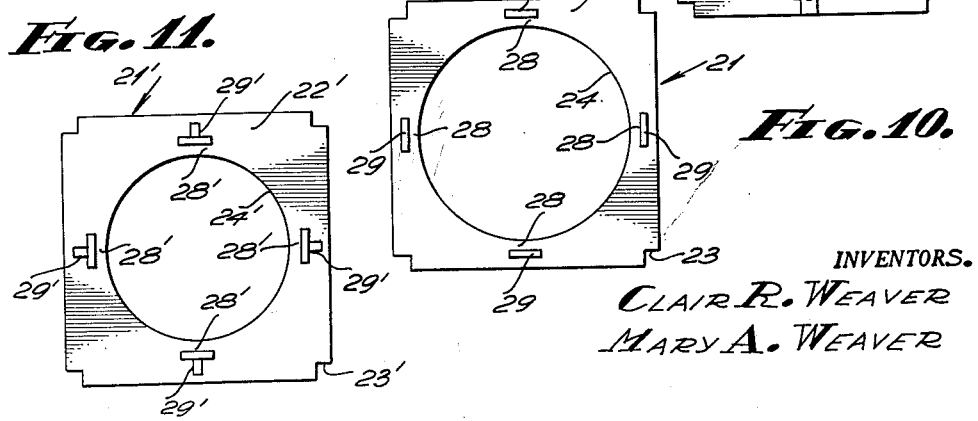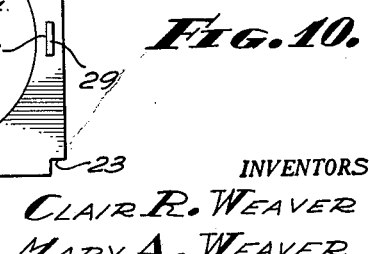
INVENTORS.
CLAIR R. WEAVER
MARY A. WEAVER

United States Patent Office 3,075,565
Patented Jan. 29, 1963

3,075,565
COMBINATION EQUAL-SHARE PIE CUTTING GUIDE AND CARRYING CASE
Clair R. Weaver and Mary A. Weaver, Long Beach, Calif., assignors of one-tenth to Gadget-Of-The-Month Club, Inc., North Hollywood, Calif., a corporation of California
Filed Aug. 29, 1960, Ser. No. 52,586
5 Claims. (Cl. 146—150)

The present invention consists of a combination equal-share cutting guide and carrying case which, in one preferred form, is adapted primarily for use in cutting pie into various numbers of equal sector-shaped cuts, such as four equal pieces, five equal pieces, six equal pieces, or any other desired number of pieces of pie cut into exactly equal sector-shaped pieces. While the apparatus of the present invention is intended primarily for cutting pie, which is normally carried in a circular conventional pie pan, it should be noted that the invention may be so arranged as to be capable of use for cutting various other pastry objects or food objects of circular plan view shape into a number of sector-shaped pieces of equal size and is not specifically limited to cutting pie into sector-shaped pieces of equal size, and the description and claims which follow are to be construed broadly as being applicable to other food objects of this type.

It should be noted that the present invention includes means for making it possible to quickly and easily cut a pie or other pastry object into various desired numbers of pieces such as four pieces, five pieces, six pieces, or the like, of equal sector-shaped size by using novel cutting template guide means positively centered with respect to an underlying pie or pastry of circular plan view shape and vertically spaced thereabove whereby to avoid crushing the upper surface thereof, and with the novel template guide means being of a nature such that each cutting stroke of a knife blade carried by the cutting template guide means may, in certain forms of the invention, comprise a radial cut or a complete cut diametrically completely across the pie or pastry and extending exactly through the center thereof and bisecting the pie exactly, although the invention is not specifically so limited.

It will readily be understood that interchangeable cutting template guide means having different numbers of radially directed equally circumferentially spaced pairs of closely adjacent knife blade guide members will make it possible, by a series of successive cuts of the type referred to above, to produce virtually any desired number of equal-sized sector-shaped pieces of the pie or pastry.

Furthermore, it will readily be understood that the cutting operation is extremely easy, simple, and quick to perform and, since interchangeable cutting template guide means corresponding to various desired number of equal-sized pieces of pie or pastry are interchangeable carried by the apparatus, it will be possible to quickly place the desired cutting template guide means in operative relationship with respect to a pie carried in a pie pan thereunder, after which a knife blade may be inserted and a series of successive cutting strokes performed to quickly and easily cut the pie into the desired number of equal-sized sector-shaped pieces.

It is an object of the present invention to provide a combination equal-share pastry or pie cutting guide and carrying case of the character referred to above which includes means for supporting, in a compact manner requiring very small space volume, interchangeable pastry pan supporting panel means adapted to support several different sizes of conventional pastry or pie pans, and also including several different cutting template guide means adapted for use in cutting a pastry or pie into various numbers of equal-sized sector-shaped pieces, with the whole compact apparatus being provided with cover means removably cooperable with an underlying base whereby to encompass and enclose the entire apparatus during non-use, storage periods.

It is a further object to provide apparatus of the character referred to above which is of extremely simple, cheap, foolproof construction such as to be conducive to widespread use of the device.

Further objects are implicit in the detailed description which follows hereinafter and will be apparent to persons skilled in the art after a careful study thereof.

For the purpose of clarifying the nature of the present invention, one exemplary embodiment of the invention is illustrated in the hereinbelow described figures of the accompanying three sheets of drawings and is described in detail hereinafter.

FIG. 1 is an exploded oblique view of a portion of one exemplary embodiment of the present invention with a part of the cover means broken away to show the interior thereof.

FIG. 2 is a top plan view of the form of the invention illustrated in FIG. 1 in operative pie-cutting position and with respect to a pie pan (which is shown without a pie for reasons of drawing simplification and clarity). This view shows the assembled operative apparatus with the cover means removed and also shows certain portions of the apparatus partly broken away in order to clarify the structural details which would otherwise be hidden.

FIG. 3 is an elevational view of the apparatus shown in FIG. 2.

FIG. 4 is an enlarged view, partly in section and partly in elevation, taken in the direction of the arrows 4—4 of FIG. 2. However, in this view a pie is shown carried in the pie pan and is illustrated in the act of being cut into four equal pieces by a knife cooperating with the cutting template guide means.

FIG. 5 is a fragmentary view, on an enlarged scale, taken in the direction of the arrows 5—5 of FIG. 2.

Figure 1:
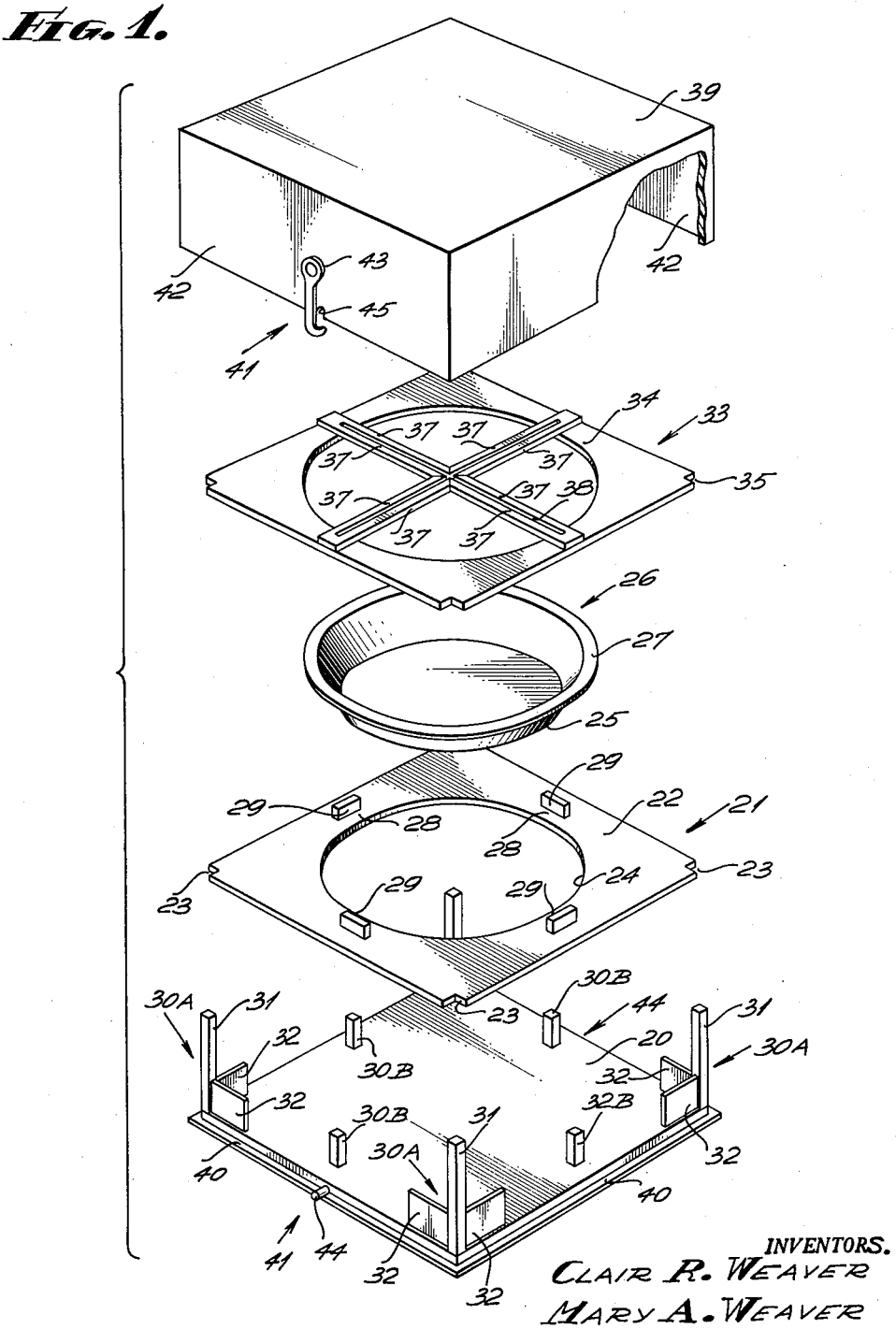

FIG. 6 is a reduced-size view of the complete assembly in non-use storage position, wherein the two different supporting panel means shown in FIGS. 10 and 11 adapted to support different sizes of pastry or pie pans are vertically stacked, and wherein the three different cutting template guide means shown in FIG. 7-9 and adapted to cut a circular pie or pastry, respectively, into six equal size sector-shaped pieces, five equal-size sector-shaped pieces, and four equal-size sector-shaped pieces, respectively, are stacked. In other words, this view shows the entire device with two interchangeable pie pan-supporting panels and three interchangeable cutting template guide means all stacked in closely vertically adjacent relationship above a base and underneath an encompassing cover means, which is shown partially broken away in order to show the stacked interior assembly.

FIG. 7 is a top plan view of one of the interchangeable cutting template guide means of the six-piece type.

FIG. 8 is a top plan view of another one of the interchangeable cutting template guide means of the five-piece type.

FIG. 9 is a top plan view of another one of the interchangeable cutting template guide means of the four-piece type.

FIG. 10 is a top plan view of one of the two supporting panel means for supporting a pastry pan or pie pan of one standard size, such as a conventional nine-inch pie pan, for example.

FIG. 11 is a top plan view of the other one of the two supporting panel means for supporting a pastry pan or pie pan of another smaller standard size, such as a conventional eight-inch pie pan, or the like.

Referring to the figures for exemplary purposes, one illustrative embodiment of the invention takes a typical exemplary form wherein it comprises a base member 20 of substantially rectangular shape, as seen in plan view, which is provided with centrally apertured pastry or pie pan supporting means, indicated generally at 21, positioned thereabove and adapted to support a conventional pastry or pie pan. In the specific example illustrated, the pastry pan-supporting means indicated generally at 21 takes the form of a supporting panel 22 of substantially rectangular shape, as seen in plan view (exclusive of corner cutouts 23), having a circular centrally apertured portion 24 of a size such as to receive downwardly therethrough the central downwardly inclined and directed side wall portion 25 of a conventional pastry pan or pie pan, indicated generally at 26, with the outwardly directed edge flange 27 of the pie pan 26 being adapted to rest upon the upper surface of the supporting panel means 22 along the annular surface indicated at 28 in a positively centered manner by reason of the contact of inner faces of the spacing and positioning means or blocks 29 against the circumferential outer edge of the pie pan edge flange 27.

It should be noted that the supporting panel means 22 is carried in vertically spaced relationship above the base 20 by supporting means including corner supporting means 30A and intermediate supporting means 30B. The corner supporting means 30A comprises the four upstanding corner posts 31 adapted to slidably engage the similarly shaped corner cutouts 23 of the supporting panel means 22, with lower corner portions 32 being adapted to abut the lower surface of the supporting panel means 22 whereby to firmly support it in a vertically spaced position above the base 20 in an easily manually removable manner. In the specific form illustrated, the intermediate supporting means 30B comprises four upstanding posts adapted to contact the lower surface of the supporting panel means 22.

It should be noted that the centrally apertured portion 24 of the supporting panel means 22 is of a size such as to receive and support the pie or pastry pan 26 which is of some standard conventional size. However, the invention also contemplates interchanging one or more additional supporting panels having different-sized central apertures for receiving different-sized pastry or pie pans. For example, FIG. 10 illustrates, in plan view, the supporting panel means 22 shown in FIG. 1. However, FIG. 11 illustrated another interchangeable supporting panel 22' having a central aperture 24' smaller than the central aperture 24 in the supporting panel 22 and, therefore, adapted to support a somewhat smaller pie pan than the pie pan 26 shown in FIG. 1. All parts of the interchangeable supporting panel means shown in FIG. 11 (and also in FIG. 6) are indicated by similar reference numerals, primed, however.

The exemplary form of the invention indicated in FIGS. 1–5 also includes a plurality of interchangeable cutting template guide means such as the four-piece type indicated generally at 33 in FIGS. 1 and 9, which is of substantially rectangular outside configuration as seen in plan view and which comprises a panel 34 having corner cutouts 35 generally similar to the corner cutouts 23 of the supporting panel means 22 and similarly adapted to slidably engage the four corner posts 31 when the lower surface of the panel 34 rests upon the top surfaces of each of the spacing and positioning blocks 29 carried by the top surface of the supporting panel means 22, whereby to vertically spacedly support the cutting template guide means 33 in a centered manner above the supporting panel means 22 and the pie pan 26 carried thereby, with sufficient vertical clearance therebetween, as best shown in FIG. 4, to avoid crushing the upper surface 36 of a pie carried within the pie pan 26.

The cutting template guide means 33 includes a plurality of circumferentially equally spaced radially directed pairs 37 of closely adjacent knife blade guide members with each pair defining therebetween a slot 38 adapted to receive therethrough a knife blade, such as is shown at 39 in FIG. 4, whereby to guide the knife blade as it is manually moved along the slot 38 from one edge of the pie 36 to the opposite edge thereof as is shown in FIG. 4.

It will be noted that in the form illustrated in FIGS. 1–5, only two diametrical cuts will be necessary in order to divide the pie 36 into four equal-sized sector-shaped pieces. When the six-piece type of interchangeable cutting template guide means, indicated generally at 33' in FIG. 7 is employed in lieu of the four-piece type shown in FIGS. 1–5, only three diametrical cuts will be required to divide the pie into six equal-sized sector-shaped slices. Corresponding parts of this version are indicated by similar reference numerals, primed, however.

When employing the interchangeable five-piece type of cutting template guide means indicated generally at 33" in FIG. 8 in lieu of the four-piece type shown in FIGS. 1–5, it will be necessary to make five radial cuts along the slots 38" in order to produce five equal-sized sector-shaped pieces of pie. Similar parts of this interchangeable cutting template guide means are indicated by similar reference numerals, doubly primed, however.

The two interchangeable pie pan-supporting panel means shown at 22 in FIG. 10 and 22' in FIG. 11, and the three interchangeable cutting template guide means shown at 33 in FIG. 9, at 33' in FIG. 7, and at 33" in FIG. 8, are all adapted to be supported in vertically nested relationship with the corner cutouts 23, 23', 35, 35', and 35" slidably engaging the four corner posts 31, whereby to occupy a very small space above the base 20 and to be encompassed and closed in by a removable cover means 39, which is of substntially cubicle shape adapted to rest upon an outer lip 40 of the base 20 in effective sealing engagement therewith and to be maintained in said relationship by controllably fastenable and unfastenable locking means indicated generally at 41. In the specific example illustrated, there are two such locking means 41 carried by opposite side walls 42 of the cover means 39, and comprising pivotally mounted hooks 43 removably fastenably engageable with corresponding pins 44 carried by the base 20, which are adapted to be received in corresponding notches 45 in the side walls 42. However, various other fastening means may be employed, if desired.

While the apparatus is shown as being formed of plastic material, with the pie pan of course being formed of metal, various other suitable materials may be employed.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

We claim:

1. An equal-share cutting guide, comprising: a base member provided with a centrally circularly apertured container supporting means positioned thereabove for receiving downwardly therethrough the central downwardly directed circular portion of a conventional circular container pan having an outwardly directed annular edge flange adapted to rest upon said supporting means immediately radially outside of the centrally apertured portion of said supporting means; cutting template guide means removably mounted in vertically spaced position above said supporting means and including a plurality of circumferentially equally spaced radially directed pairs of closely adjacent knife-blade-guide members for guiding a knife blade extended downwardly therethrough for the purpose of cutting an object carried by the container therebelow into equal portions corresponding to the number of pairs of guide members; and spacing and positioning means carried at the top of said supporting means symmetrically around the centrally apertured portion thereof and positionally cooperative with the annular edge flange of the container for positively centering it with respect to the supporting means and also effectively comprising vertical spacer means for said cutting template guide means.

2. Apparatus of the character defined in claim 1, including cover means removably cooperable for engagement with said base member in encompassing relationship with respect to said supporting means and said cutting template guide means, and controllably fastenable and unfastenable locking means for fastening said cover means in closed relationship with respect to said base member.

3. Apparatus of the character defined in claim 1, including upstanding means removably carrying said supporting means in vertically spaced position directly above said base member.

4. An equal-share pastry cutting guide, comprising: a base member of substantially rectangular shape as seen in plan view, said base being removably provided with supporting panel means of substantially rectangular shape as seen in plan view vertically spacedly positioned thereabove and substantially parallel thereto and having a centrally circularly apertured portion for receiving downwardly therethrough the central downwardly directed circular portion of a conventional pastry pan having an outwardly directed edge flange adapted to rest upon the upper surface of said supporting panel means immediately radially outside of the centrally apertured portion of said supporting panel means; four upstanding corner post means removably carrying said supporting panel means in said vertically spaced position directly above said base member; spacing and positioning means carried by the upper surface of said supporting panel means symmetrically around the centrally apertured portion thereof and positionally cooperative with the edge flange of the pastry pan for positively centering it with respect to the supporting panel means; and cutting template guide means of substantially rectangular configuration as seen in plan view comprising a panel removably mounted by said four corner post means and said spacing and positioning means in vertically spaced position above said supporting panel means and including a plurality of circumferentially equally spaced radially directed pairs of closely adjacent knife-blade-guide members for guiding a knife blade extended downwardly therethrough for the purpose of cutting a pastry carried by the pastry pan therebelow into equal portions corresponding to the number of pairs of guide members.

5. Apparatus of the character defined in claim 4, including cover means of substantially cubicle shape removably cooperable for engagement with said base member in encompassing relationship with respect to said supporting means and said cutting template guide means.

References Cited in the file of this patent
UNITED STATES PATENTS

| | | |
|---|---|---|
| 1,467,395 | Ross et al. | Sept. 11, 1923 |
| 2,434,566 | Hulsmann | Jan. 13, 1948 |